(12) United States Patent
Zhao et al.

(10) Patent No.: US 12,273,872 B2
(45) Date of Patent: *Apr. 8, 2025

(54) METHOD OF WIRELESS COMMUNICATION, TERMINAL DEVICE, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventors: Zhenshan Zhao, Guangdong (CN); Huei-Ming Lin, South Yarra (AU); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,532

(22) Filed: Mar. 8, 2024

(65) Prior Publication Data
US 2024/0292407 A1   Aug. 29, 2024

Related U.S. Application Data

(63) Continuation of application No. 17/235,628, filed on Apr. 20, 2021, now Pat. No. 11,968,661, which is a continuation of application No. PCT/CN2018/112483, filed on Oct. 29, 2018.

(51) Int. Cl.
| | |
|---|---|
| H04H 20/71 | (2008.01) |
| H04W 48/10 | (2009.01) |
| H04W 72/1263 | (2023.01) |
| H04W 72/23 | (2023.01) |

(52) U.S. Cl.
CPC ....... *H04W 72/1263* (2013.01); *H04W 48/10* (2013.01); *H04W 72/23* (2023.01)

(58) Field of Classification Search
CPC .. H04W 72/1263; H04W 72/28; H04W 48/10
USPC ........................................................ 370/312
See application file for complete search history.

(56) References Cited

FOREIGN PATENT DOCUMENTS

| WO | 2019083343 | 5/2019 |
|---|---|---|
| WO | 2020032605 | 2/2020 |
| WO | 2020034222 | 2/2020 |
| WO | 2020071783 | 4/2020 |

OTHER PUBLICATIONS

IPA, Office Action for AU Application No. 2018448115, Jul. 2, 2024.
IPI, Hearing Notice for IN Application No. 202117019466, Jul. 29, 2024.
KIPO, Office Action for KR Application No. 10-2021-7011511, Oct. 23, 2023.
IPA, Notice of Acceptance for Patent Application for AU Application No. 2018448115, Nov. 26, 2024.

*Primary Examiner* — Temica M Beamer
(74) *Attorney, Agent, or Firm* — Hodgson Russ LLP (57) ABSTRACT

A method of wireless communication, a terminal device, and a non-transitory computer readable storage medium are provided. The method includes the following. A terminal device receives first configuration information from a network device. The first configuration information is used by the terminal device to determine a basic parameter set used for transmitting a sidelink channel.

17 Claims, 5 Drawing Sheets

Obtain, by a terminal device, first configuration information — S210

Determine, by the terminal device, a basic parameter set used for transmitting a sidelink channel, according to the first configuration information and a time point of transmitting a sidelink synchronization signal block (S-SSB) — S220

```
Determine, by a terminal device, that a time point of transmitting a
sidelink channel and a time point of transmitting a sidelink          — S310
synchronization signal block (S-SSB) are the same and a basic
parameter set used for transmitting the sidelink channel and a basic
parameter set used for transmitting the S-SSB are different
```

```
Determine, by the terminal device, to transmit the sidelink channel   — S320
first or to transmit the S-SSB first
```

```
Transmit, by a network device, first configuration      — S31
information to a terminal device, where the first
configuration information is used by the terminal
device to determine a basic parameter set used for
transmitting a sidelink channel
```

METHOD OF WIRELESS COMMUNICATION, TERMINAL DEVICE, AND NON-TRANSITORY COMPUTER READABLE STORAGE MEDIUM

CROSS-REFERENCE TO RELATED APPLICATION(S)

This application is a continuation of U.S. application Ser. No. 17/235,628, filed Apr. 20, 2021, which is a continuation of International Application No. PCT/CN2018/112483, filed Oct. 29, 2018, the entire disclosures of which are incorporated herein by reference.

TECHNICAL FIELD

The present disclosure relates to the technical field of communications, and in particular, to a method of wireless communication, a terminal device, and a non-transitory computer readable storage medium.

BACKGROUND

In a new radio (NR)-based vehicle to everything (V2X) system (NR-V2X for short), a sidelink can support multiple basic parameter sets, and basic parameter sets for a physical sidelink control channel (PSCCH), a physical sidelink shared channel (PSSCH), and a sidelink synchronization signal block (S-SSB) may be different. In this condition, for terminal devices, how to perform S-SSB transmission and PSCCH transmission or how to perform the S-SSB transmission and PSSCH transmission is an urgent problem to be solved.

SUMMARY

Implementations of the present disclosure provide a method of wireless communication, a terminal device, and a non-transitory computer readable storage medium.

According to a first aspect, a method of wireless communication is provided. The method includes the following. A terminal device receives first configuration information from a network device, where the first configuration information is used by the terminal device to determine a basic parameter set used for transmitting a sidelink channel. The basic parameter set includes at least one of a sub-carrier spacing or a cyclic prefix (CP) type. The sidelink channel includes a physical sidelink feedback channel (PSFCH), and the basic parameter set used for transmitting the PSFCH and a basic parameter set used for transmitting a sidelink synchronization signal block (S-SSB) are the same.

According to a second aspect, a terminal device is provided. The terminal device includes a transceiver, at least one processor, and a memory storing computer programs which, when executed by the at least one processor, cause the transceiver to receive first configuration information from a network device, where the first configuration information is used by the terminal device to determine a basic parameter set used for transmitting a sidelink channel. The basic parameter set includes at least one of a sub-carrier spacing or a cyclic prefix (CP) type. The sidelink channel includes a physical sidelink feedback channel (PSFCH), and the basic parameter set used for transmitting the PSFCH and a basic parameter set used for transmitting a sidelink synchronization signal block (S-SSB) are the same.

According to a third aspect, a non-transitory computer readable storage medium is provided. The storage medium stores computer programs which, when executed by a terminal device, cause the terminal device to receive first configuration information from a network device, where the first configuration information is used by the terminal device to determine a basic parameter set used for transmitting a sidelink channel. The basic parameter set includes at least one of a sub-carrier spacing or a cyclic prefix (CP) type. The sidelink channel includes a physical sidelink feedback channel (PSFCH), and the basic parameter set used for transmitting the PSFCH and a basic parameter set used for transmitting a sidelink synchronization signal block (S-SSB) are the same.

DETAILED DESCRIPTION

The technical solutions in implementations of the present disclosure will be described in the following with reference to the accompanying drawings in the implementations of the present disclosure. Apparently, the described implementations are merely a part of rather than all the implementations of the present disclosure. All other implementations obtained by those of ordinary skill in the art based on the implementations of the present disclosure without creative efforts are within the scope of the present disclosure.

It should be understood that the technical solutions in the implementations of the present disclosure can be applied to a device to device (D2D) communication system, for example, an internet of vehicles (IoV) system that performs D2D communication based on a long term evolution (LTE) system. Different from a conventional manner in which in the LET system communication data between terminals is received or transmitted through a network device (e.g., a base station), the IoV system adopts D2D direct communication, and thus a relatively high spectrum efficiency and a relatively low transmission latency can be provided.

In an implementation, a communication system on which the IoV system is based may be a global system of mobile communication (GSM), a code division multiple access (CDMA) system, a wideband code division multiple access (WCDMA) system, a general packet radio service (GPRS), the LTE system, an LTE frequency division duplex (FDD) system, an LTE time division duplex (TDD) system, a universal mobile telecommunication system (UMTS), a worldwide interoperability for microwave access (WiMAX) communication system, a fifth generation (5G) new radio (NR) system, or the like.

A terminal device in the implementations of the present disclosure may be a terminal device that can implement D2D communication, for example, may be a vehicle-mounted terminal device, a terminal device in the 5G network, a terminal device in a future evolution public land mobile network (PLMN), or the like, which is not limited in the implementations of the present disclosure.

Figure 1:
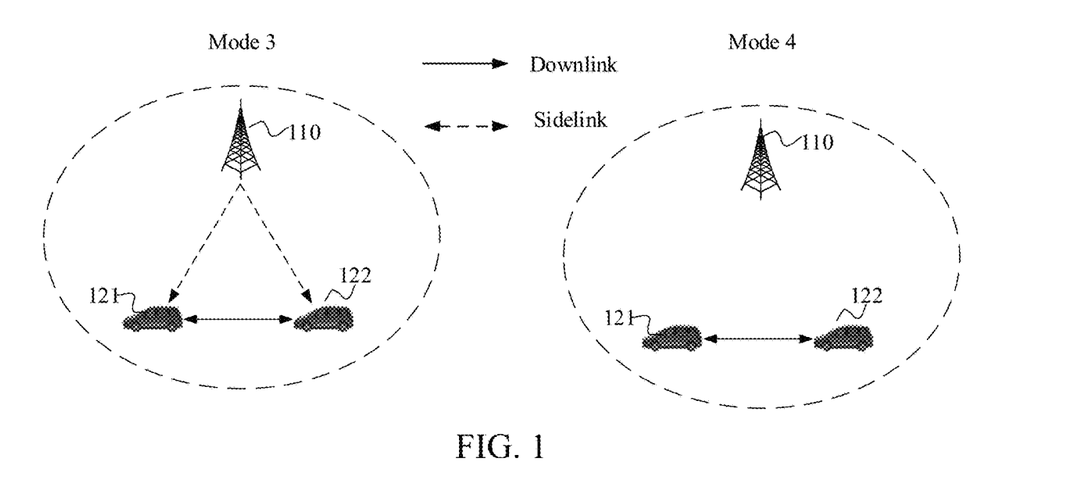
FIG. 1 is a schematic diagram illustrating an application scenario according to an implementation of the present disclosure.

FIG. 1 is a schematic diagram illustrating an application scenario according to an implementation of the present disclosure. As an example, FIG. 1 illustrates a network device 110 and two terminal devices 121 and 122. In an implementation of the present disclosure, a wireless communication system may include multiple network devices, and in a coverage area of each network device, other numbers of terminal devices may be included, which is not limited in the implementation of the present disclosure.

In an implementation, the wireless communication system may further include a mobility management entity (MME), a serving gateway (S-GW), a packet data network gateway (P-GW), or other network entities. The communication system may further include a session management function (SMF), a unified data management (UDM), an authentication server function (AUSF), or other network entities, which is not limited in the implementation of the present disclosure.

In the IoV system, the terminal device can adopt mode 3 and mode 4 to perform communication.

In an implementation, a terminal device 121 and a terminal device 122 can communicate with each other in a D2D communication mode. When performing D2D communication, the terminal device 121 and the terminal device 122 directly communicate with each other through a D2D link, i.e., sidelink (SL). In mode 3, transmission resources of the terminal device are allocated by a base station, and the terminal device can transmit data on the SL according to the resources allocated by the base station. The base station can allocate resources required by a single transmission to the terminal device, and can also allocate resources required by semi-persistent transmission to the terminal device. In mode 4, the terminal device adopts a sensing-reservation transmission mode, and the terminal device autonomously selects transmission resources from SL resources. In the implementation, the terminal device obtains a set of available transmission resources from a resource pool by means of sensing, and randomly selects one resource from the set of available transmission resources to perform data transmission.

The D2D communication may refer to vehicle to vehicle ("V2V") communication or vehicle to everything (V2X) communication. In the V2X communication, X may generally refer to any device with wireless reception and transmission capabilities, such as but not limited to a slow-moving wireless device, a fast-moving vehicle-mounted device, or a network control node with wireless transmission and reception capabilities. It should be understood that the implementations of the present disclosure are mainly applied to V2X communication scenarios, and can also be applied to any other D2D communication scenarios, which is not limited in the implementations of the present disclosure.

It is to be understood that the terms "system" and "network" in the specification are often used interchangeably in the specification. The term "and/or" in the specification is only a description of an association relationship of associated objects, which means that there may be three relationships, for example, A and/or B, which may mean that: A exists alone, A and B both exist, and B exists alone. In addition, the character "/" in the specification generally means that an object before "/" and an object after "/" are in an "or" relationship.

Figure 2:
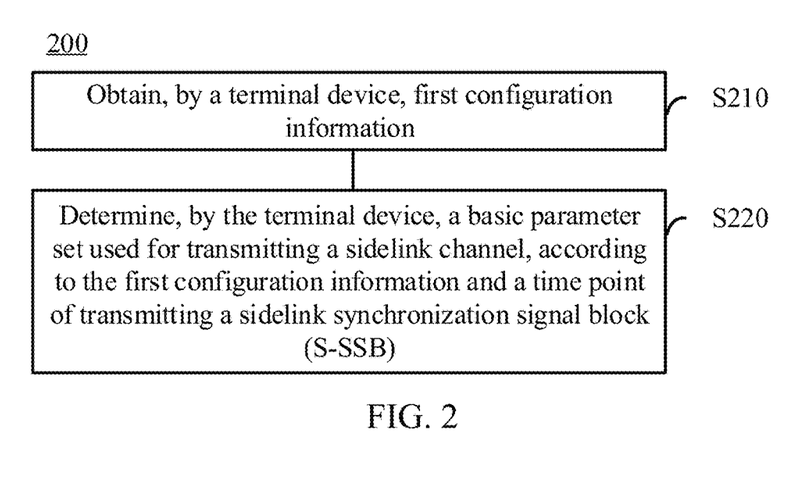
FIG. 2 is a schematic diagram illustrating a method of wireless communication according to an implementation of the present disclosure.

FIG. 2 is a schematic flow chart illustrating a method 200 of wireless communication according to an implementation of the present disclosure. The method 200 can be implemented by the terminal device in the communication system illustrated in FIG. 1. As illustrated in FIG. 2, the method 200 includes the following.

At block S210, the terminal device obtains first configuration information.

At block S220, the terminal device determines a basic parameter set used for transmitting a sidelink channel, according to the first configuration information and a time point of transmitting a sidelink synchronization signal block (S-SSB).

In an implementation of the present disclosure, the S-SSB may include a sidelink synchronization signal (SLSS) and a physical sidelink broadcast channel (PSBCH). The SLSS may include a sidelink primary synchronization signal (S-PSS) and a sidelink secondary synchronization signal (S-SSS), or may include other signals used for synchronization between terminal devices.

In an implementation of the present disclosure, the sidelink channel may be a channel used for communication between terminal devices such as a physical sidelink control channel (PSCCH), a physical sidelink shared channel (PSSCH), or a physical sidelink feedback channel (PSFCH).

In some implementations, the first configuration information may be pre-configured. For example, the first configuration information may be established via a protocol. Further, the first configuration information established via the protocol may be preset in the terminal device.

In some implementations, the first configuration information may be configured by a network device. The network device can configure the first configuration information for the terminal device according to messages, information, or signaling used for communication between the network device and the terminal device, such as broadcast information, radio resource control (RRC) signaling, or downlink control information (DCI).

In some implementations, the first configuration information may be indicative of a determination manner ("manner 1") of the basic parameter set used for transmitting the sidelink channel. For example, the first configuration information may be indicative of the determination manner or determination rule of the basis parameter set used for transmitting the sidelink channel under some particular conditions, for example, under a condition that a time point of transmitting the sidelink channel is the same as or different from the time point of transmitting the S-SSB.

Furthermore, the terminal device can determine the basic parameter set used for transmitting the sidelink channel, according to the first configuration information and the time point of transmitting the S-SSB. For example, the terminal device can determine the basic parameter set used for transmitting the sidelink channel, according to the time point of transmitting the S-SSB, the time point of transmitting the sidelink channel, and the determination manner of the basic parameter set used for transmitting the sidelink channel indicated by the first configuration information.

In some implementations, the first configuration information can be used for configuring a basic parameter set of a resource pool of the sidelink channel ("manner 2"). The basic parameter set of the resource pool of the sidelink channel and a basic parameter set used for transmitting the SSB are the same. On condition that the terminal device determines that the time point of transmitting the sidelink channel and the time point of transmitting the S-SSB are the same, the terminal device can transmit the sidelink channel by using resources in the resource pool indicated by the first configuration information, such that it can be ensured that the basic parameter set used for transmitting the sidelink channel and the basic parameter set used for transmitting the SSB are the same.

That is to say, the first configuration information can configure the dedicated resource pool used in a condition that the time point of transmitting the sidelink channel and the time point of transmitting the S-SSB are the same. When the sidelink channel and the S-SSB are simultaneously transmitted, the terminal device can transmit the sidelink channel by using the resources in the dedicated resource pool. Since the basic parameter set of the dedicated resource pool and the basic parameter set used for transmitting the S-SSB are the same, it can be ensured that simultaneous transmission of the sidelink channel and the S-SSB can be realized with the same basic parameter set, thereby further reducing processing complexity of the terminal device.

In some implementations, for the manner 1, the first configuration information is indicative of that the basic parameter set used for transmitting the sidelink channel and the basic parameter set used for transmitting the S-SSB are the same on condition that the time point of transmitting the sidelink channel and the time point of transmitting the S-SSB are the same, or is indicative of that the basic parameter set used for transmitting the sidelink channel and the basic parameter set used for transmitting the S-SSB are the same or different on condition that the time point of transmitting the sidelink channel and the time point of transmitting the S-SSB are different.

In this condition, the operation at block S220 may include the following. Determine the basic parameter set used for transmitting the sidelink channel, according to the time point of transmitting the sidelink channel, the time point of transmitting the S-SSB, and the first configuration information.

For example, on condition that the time point of transmitting the sidelink channel and the time point of transmitting the S-SSB are the same, the terminal device can determine, according to the first configuration information, that the basic parameter set used for transmitting the sidelink channel and the basic parameter set used for transmitting the S-SSB are the same. In this way, when the sidelink channel and the S-SSB are simultaneously transmitted, since transmission of the sidelink channel and transmission of the S-SSB use the same basic parameter set, the processing complexity of the terminal device can be reduced.

For another example, on condition that the time point of transmitting the sidelink channel and the time point of transmitting the S-SSB are different, the terminal device can determine, according to the first configuration information, that the basic parameter set used for transmitting the sidelink channel and the basic parameter set used for transmitting the S-SSB are the same or different. Since the sidelink channel and the S-SSB are not simultaneously transmitted, the terminal device transmits a signal or data of only one basic parameter set at a time point, which can reduce the processing complexity of the terminal device.

Therefore, the terminal device determines the basic parameter set used for transmitting the sidelink channel, according to the determination manner of the basic parameter set used for transmitting the sidelink channel indicated by the first configuration information, the time point of transmitting the sidelink channel to be transmitted, and the time point of transmitting the S-SSB to be transmitted. For example, on condition that the time point of transmitting the sidelink channel and the time point of transmitting the S-SSB are the same, it is determined that the basic parameter set used for transmitting the sidelink channel and the basic parameter set used for transmitting the S-SSB are the same, and on condition that the time point of transmitting the sidelink channel and the time point of transmitting the S-SSB are different, it is determined that the basic parameter set used for transmitting the sidelink channel and the basic parameter set used for transmitting the S-SSB are the same or different, which can ensure that the terminal device transmits a signal and/or data of only one basic parameter set at a time point, thereby reducing the processing complexity of the terminal device.

In some implementations, for the manner 2, the operation at block S220 may further include the following. On condition that the time point of transmitting the sidelink channel and the time point of transmitting the S-SSB are the same, the terminal device determines the basic parameter set of the resource pool of the sidelink channel indicated by the first configuration information as the basic parameter set used for transmitting the sidelink channel.

On condition that a basic parameter set of a resource pool of the S-SSB is basic parameter set 1, the basic parameter set of the resource pool of the sidelink channel indicated by the first configuration information may also be basic parameter set 1. In this way, on condition that the time point of transmitting the sidelink channel and the time point of transmitting the S-SSB are the same, the terminal device can transmit the sidelink channel by using the resources in the resource pool of the sidelink channel indicated by the first configuration information, which can ensure that simultaneous transmission of the sidelink channel and the S-SSB can be realized with the same basic parameter set. That is to say, the terminal device transmits a signal and/or data of only one basic parameter set at a time point, thereby reducing the processing complexity of the terminal device.

It is to be understood that in an implementation of the present disclosure, the terminal device can determine the time point of transmitting the S-SSB according to pre-configured information or information configured by the network device. For example, a period of S-SSB transmission and specific sub-frames or time slots to be transmitted in each period can be determined according to the pre-configured information. Furthermore, symbol positions occupied by the S-SSB in a time slot can be determined according to the pre-configured information. In an implementation, the S-PSS and the S-SSS may occupy a first symbol position and a third symbol position in a time slot, respectively, and the PSBCH may occupy a second symbol position and a fourth symbol position, that is, some fixed symbol positions in a time slot are used to transmit the S-SSB.

It should also be understood that in an implementation of the present disclosure, the terminal device can also determine the time point of transmitting the sidelink channel. For example, a time point of transmitting the PSSCH can be determined according to the PSCCH. If the terminal device transmits the PSCCH in a time domain position occupied by the S-SSB, it can be determined that the time point of transmitting the sidelink channel is the same as the time point of transmitting the S-SSB. For another example, a time point of transmitting the PSFCH can be determined according to a time point of transmitting data corresponding to information to be fed back. The time point of transmitting the PSFCH is usually after the time point of transmitting the data corresponding to the information to be fed back, and a time interval between the time point of transmitting the PSFCH and the time point of transmitting the data corresponding to the information to be fed back is fixed, for example, 4 time slots. If the determined time point of transmitting the PSFCH is in the time domain position occupied by the S-SSB, it can be determined that the time point of transmitting the sidelink channel and the time point of transmitting the S-SSB are the same.

In an implementation of the present disclosure, the time point of transmitting the sidelink channel and the time point of transmitting the S-SSB being the same refers to one of the following. The time point of transmitting the sidelink channel by the terminal device and the time point of transmitting the S-SSB by the terminal device are the same. A time point of receiving the sidelink channel by the terminal device and a time point of receiving the S-SSB by the terminal device are the same. The time point of transmitting the sidelink channel by the terminal device and the time point of receiving the S-SSB by the terminal device are the same. The time point of receiving the sidelink channel by the terminal device and the time point of transmitting the S-SSB by the terminal device are the same.

That is to say, the sidelink channel may refer to a sidelink channel to be transmitted by the terminal device or a sidelink channel to be received by the terminal device. The S-SSB may refer to an S-SSB to be transmitted by the terminal device or an S-SSB to be received by the terminal device.

If the sidelink channel and the S-SSB are transmitted at the same time, the sidelink channel and the S-SSB may be frequency division, code division, or the like.

In an implementation of the present disclosure, the basic parameter set includes but is not limited to a sub-carrier spacing, a cyclic prefix (CP) type, etc.

In some implementations, for configuring the resource pool of the sidelink channel and the resource pool of the S-SSB, the resource pool of the sidelink channel and the resource pool of the S-SSB can be configured to not contain same time domain resources, that is, the sidelink channel and the S-SSB are transmitted in time division, i.e., the sidelink channel and the S-SSB are not transmitted at the same time, which helps to avoid a problem that the terminal device transmits signals and data of different basic parameter sets at the same time.

In some implementations, the resource pool of the sidelink channel and the resource pool of the S-SSB that do not contain the same time domain resources can be pre-configured or configured by the network device.

Figure 3:
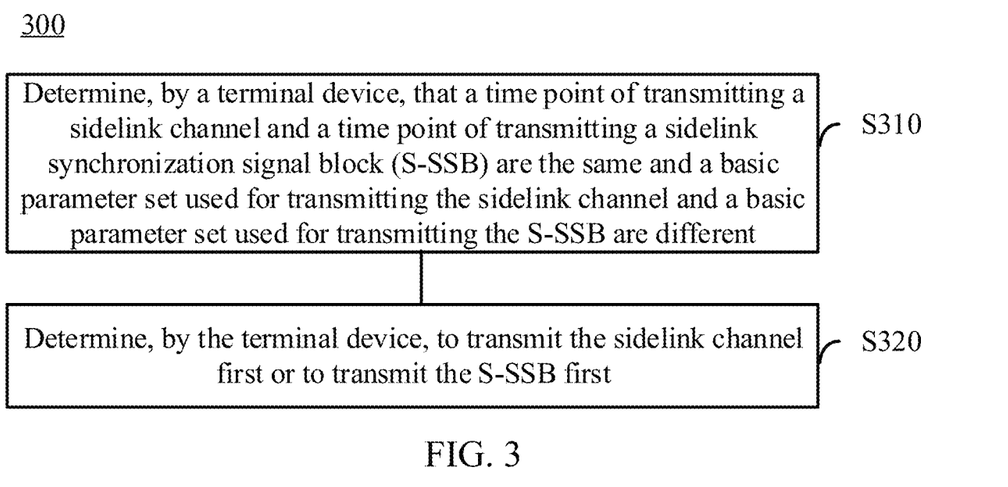
FIG. 3 is a schematic diagram illustrating a method of wireless communication according to an implementation of the present disclosure.

FIG. 3 is a schematic flow chart illustrating a method 300 of wireless communication according to another implementation of the present disclosure. The method 300 is executed by the terminal device in the communication system illustrated in FIG. 1. As illustrated in FIG. 3, the method 300 includes the following.

At block S310, the terminal device determines that a time point of transmitting a sidelink channel and a time point of transmitting an S-SSB are the same, and a basic parameter set used for transmitting the sidelink channel and a basic parameter set used for transmitting the S-SSB are different.

At block S320, the terminal device determines to transmit the sidelink channel first or the S-SSB first.

In an implementation of the present disclosure, the S-SSB may include an SLSS and a PSBCH. The SLSS may include an S-PSS and an S-SSS.

In an implementation of the present disclosure, the sidelink channel may be a channel used for communication between terminal devices such as a PSCCH, a PSSCH, or a PSFCH.

Similar to the above implementation, the terminal device can determine the time point of transmitting the sidelink channel and the time point of transmitting the S-SSB, which will not be repeated herein.

In some conditions, the terminal device determines that the time point of transmitting the sidelink channel and the time point of transmitting the S-SSB are the same, and the basic parameter set used for transmitting the sidelink channel and the basic parameter set used for transmitting the S-SSB are different. In this condition, if the terminal device transmits signals and data of two basic parameter sets at the same time, processing complexity of the terminal device is increased. In this condition, the terminal device can select to transmit one signal or one kind of data first. For example, for the terminal device, the importance of the S-SSB is usually higher than that of the sidelink channel, and thus the terminal device can transmit the S-SSB first, and then transmit the sidelink channel after transmission of the S-SSB.

In some implementations, the operation at block S320 may include that the terminal device determines to transmit the sidelink channel first or to transmit the S-SSB first, according to a first parameter of a to-be-transmitted service on the sidelink channel.

In some implementations, the first parameter includes at least one of a service priority, a service latency, a service reliability, a service throughput, or a quality of service (QoS) parameter.

That is to say, in a condition that the time point of transmitting the sidelink channel and the time point of transmitting the S-SSB are the same and the basic parameter set used for transmitting the sidelink channel and the basic parameter set used for transmitting the S-SSB are different, the terminal device can determine whether to transmit the sidelink channel first or to transmit the S-SSB first according to a transmission parameter of the to-be-transmitted service on the sidelink channel. For example, if the to-be-transmitted service is a latency-sensitive service such as an ultra-reliable and low latency communication (URLLC) service, the terminal device can determine to transmit the sidelink channel first. For another example, if the to-be-transmitted service is a latency-insensitive service such as a cooperative awareness message (CAM) service, the terminal device can determine to transmit the S-SSB first.

In some implementations, the terminal device determines, according to the first parameter of the to-be-transmitted service on the sidelink channel, to transmit the sidelink channel first or to transmit the S-SSB first as follows. If a transmission requirement of the first parameter of the to-be-transmitted service on the sidelink channel is higher than or equal to a first threshold, the terminal device determines to transmit the sidelink channel first. If the transmission requirement of the first parameter of the to-be-transmitted service on the sidelink channel is lower than the first threshold, the terminal device determines to transmit the S-SSB first.

That is to say, in an implementation of the present disclosure, if the to-be-transmitted service on the sidelink channel has a relatively high service priority (e.g., the service priority is higher than a first priority threshold), a relatively high latency requirement (e.g., a latency is lower than a first latency threshold), a relatively high reliability requirement (e.g., a reliability is larger than a first reliability threshold), a relatively high throughput requirement (e.g., a throughput is larger than a specific throughput threshold), or a relatively high QoS (e.g., a QoS is larger than a QoS threshold), the terminal device can transmit the sidelink channel first to ensure that the to-be-transmitted service can be transmitted in time.

In an implementation, if the transmission requirement of the to-be-transmitted service is relatively low, the terminal device transmits the S-SSB first to ensure timely transmission of an important signal (i.e., the S-SSB).

In combination with FIG. 2 and FIG. 3, the method of wireless communication according to the implementations of the present disclosure is described in detail from the perspective of the terminal device, and a method of wireless communication according to implementations of the present disclosure is described below in conjunction with FIG. 4 from the perspective of the network device. It should be understood that the description of the network device side and the description of the terminal device side correspond to each other, and for similar descriptions, reference may be made to the foregoing implementations.

Figure 4:
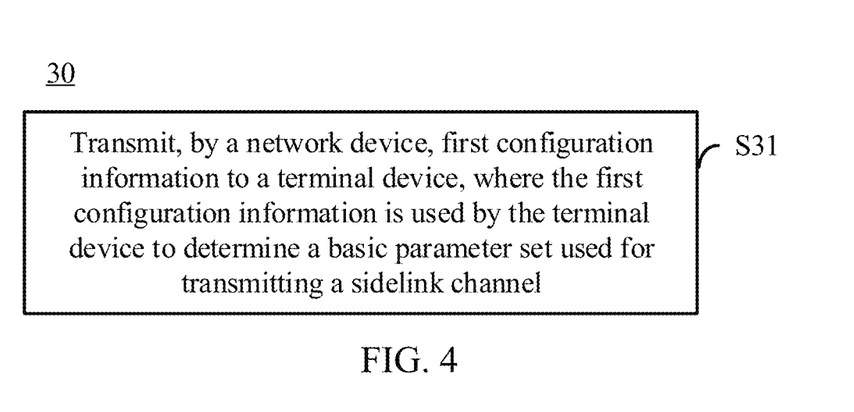
FIG. 4 is a schematic diagram illustrating a method of wireless communication according to an implementation of the present disclosure.

FIG. 4 illustrates a method 30 of wireless communication according to an implementation of the present disclosure. The method 30 can be executed by the network device 110 in the communication system 100 illustrated in FIG. 1. As illustrated in FIG. 4, the method 30 includes the following.

At block S31, the network device transmits first configuration information to a terminal device, where the first configuration information is used by the terminal device to determine a basic parameter set used for transmitting a sidelink channel.

In some implementations, the first configuration information is indicative of a determination manner of the basic parameter set used for transmitting the sidelink channel.

In some implementations, the first configuration information is indicative of that the basic parameter set used for transmitting the sidelink channel and a basic parameter set used for transmitting an S-SSB are the same, on condition that the sidelink channel and the S-SSB are simultaneously transmitted, or indicative of that the basic parameter set used for transmitting the sidelink channel and the basic parameter set used for transmitting the S-SSB are the same or different, on condition that the sidelink channel and the S-SSB are not simultaneously transmitted.

In some implementations, the first configuration information is indicative of a resource pool of the sidelink channel, and a basic parameter set of the resource pool of the sidelink channel and the basic parameter set used for transmitting the S-SSB are the same.

In some implementations, the resource pool of the sidelink channel is a transmission resource pool of the sidelink channel or a reception resource pool of the sidelink channel.

In some implementations, the sidelink channel and the S-SSB being simultaneously transmitted includes one of the following. The sidelink channel and the S-SSB are simultaneously transmitted by the terminal device. The sidelink channel and the S-SSB are simultaneously received by the terminal device. Transmitting the sidelink channel by the terminal device and receiving the S-SSB by the terminal device simultaneously occur. Receiving the sidelink channel by the terminal device and transmitting the S-SSB by the terminal device simultaneously occur.

In some implementations, the sidelink channel is a PSCCH, a PSSCH, or a PSFCH. The S-SSB includes an SLSS and a PSBCH.

In some implementations, the operation at block S31 includes transmitting, by the network device, the first configuration information to the terminal device via broadcast information, RRC signaling, or DCI.

The above illustrates the method implementations of the present disclosure in detail in combination with FIGS. 2-4, and the following will describe device implementations of the present disclosure in detail in combination with FIGS. 5-10. It can be understood that the method implementations and the device implementations correspond to each other, and for similar descriptions, reference can be made to the method implementations.

Figure 5:
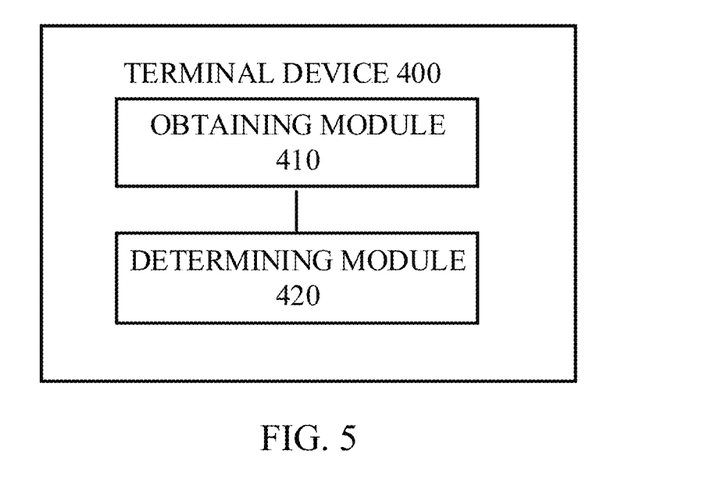
FIG. 5 is a schematic block diagram illustrating a terminal device according to an implementation of the present disclosure.

FIG. 5 is a schematic block diagram illustrating a terminal device 400 according to an implementation of the present disclosure. As illustrated in FIG. 5, the terminal device 400 includes an obtaining module 410 and a determining module 420. The obtaining module 410 is configured to obtain first configuration information. The determining module 420 is configured to determine a basic parameter set used for transmitting a sidelink channel, according to the first configuration information and a time point of transmitting an S-SSB.

In some implementations, the first configuration information is indicative of a determination manner of the basic parameter set used for transmitting the sidelink channel.

In some implementations, the first configuration information is indicative of that the basic parameter set used for transmitting the sidelink channel is the same as a basic parameter set used for transmitting the S-SSB, on condition that a time point of transmitting the sidelink channel and the time point of transmitting the S-SSB are the same, or indicative of that the basic parameter set used for transmitting the sidelink channel and the basic parameter set used for transmitting the S-SSB are the same or different, on condition that the time point of transmitting the sidelink channel and the time point of transmitting the S-SSB are different.

In some implementations, the determining module is further configured to determine the basic parameter set used for transmitting the sidelink channel, according to the time point of transmitting the S-SSB, the time point of transmitting the sidelink channel, and the first configuration information.

In some implementations, the determining module is configured to determine that the basic parameter set used for transmitting the sidelink channel and the basic parameter set used for transmitting the S-SSB are the same, in response to the time point of transmitting the sidelink channel and the time point of transmitting the S-SSB being the same, or determine that the basic parameter set used for transmitting the sidelink channel and the basic parameter set used for transmitting the S-SSB are the same or different, in response to the time point of transmitting the sidelink channel and the time point of transmitting the S-SSB being different.

In some implementations, the first configuration information is indicative of a basic parameter set of a resource pool of the sidelink channel, and the basic parameter set of the resource pool of the sidelink channel and the basic parameter set used for transmitting the S-SSB are the same.

In some implementations, the determining module is configured to determine the basic parameter set of the resource pool of the sidelink channel indicated by the first configuration information as the basic parameter set used for transmitting the sidelink channel, in response to the time point of transmitting the sidelink channel and the time point of transmitting the S-SSB being the same.

In some implementations, the resource pool of the sidelink channel is a transmission resource pool of the sidelink channel or a reception resource pool of the sidelink channel.

In some implementations, the time point of transmitting the sidelink channel and the time point of transmitting the S-SSB being the same refers to at least one of the following. The time point of transmitting the sidelink channel by the terminal device and the time point of transmitting the S-SSB by the terminal device are the same. A time point of receiving the sidelink channel by the terminal device and a time point of receiving the S-SSB by the terminal device are the same. The time point of transmitting the sidelink channel by the terminal device and the time point of receiving the S-SSB by the terminal device are the same. The time point of receiving the sidelink channel by the terminal device and the time point of transmitting the S-SSB by the terminal device are the same.

In some implementations, the sidelink channel is a PSCCH, a PSSCH, or a PSFCH. The S-SSB includes an SLSS and a PSBCH.

In some implementations, the first configuration information is pre-configured or configured by a network device.

In some implementations, the terminal device obtains the first configuration information via broadcast information, RRC signaling, or DCI.

Figure 6:
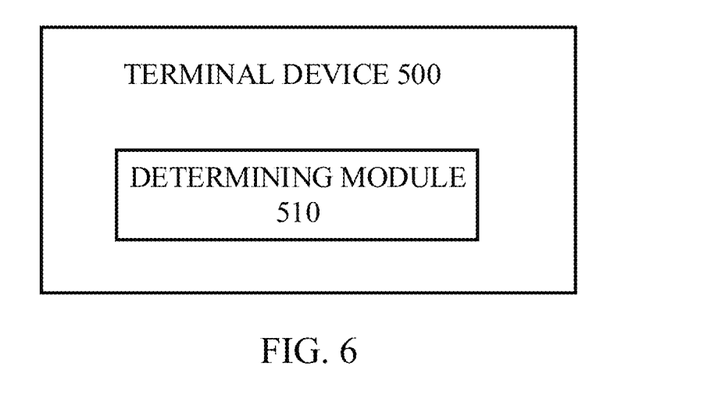
FIG. 6 is a schematic block diagram illustrating a terminal device according to another implementation of the present disclosure.

FIG. 6 is a schematic block diagram illustrating a terminal device 500 according to another implementation of the present disclosure. The terminal device 500 illustrated in FIG. 6 includes a determining module 510. The determining module 510 is configured to determine that a time point of transmitting a sidelink channel and a time point of transmitting an S-SSB are the same and a basic parameter set used for transmitting the sidelink channel and a basic parameter set used for transmitting the S-SSB are different, and determine to transmit the sidelink channel first or to transmit the S-SSB first.

In some implementations, the determining module 510 is further configured to determine to transmit the sidelink channel first or to transmit the S-SSB first, according to a first parameter of a to-be-transmitted service on the sidelink channel.

In some implementations, the determining module 510 is configured to determine to transmit the sidelink channel first, in response to a transmission requirement of the first parameter of the to-be-transmitted service on the sidelink channel being higher than or equal to a first threshold, or determine to transmit the S-SSB first, in response to the transmission requirement of the first parameter of the to-be-transmitted service on the sidelink channel being lower than the first threshold.

In some implementations, the time point of transmitting the sidelink channel and the time point of transmitting the S-SSB being the same includes the following. The time point of transmitting the sidelink channel by the terminal device and the time point of transmitting the S-SSB by the terminal device are the same. A time point of receiving the sidelink channel by the terminal device and a time point of receiving the S-SSB by the terminal device are the same. The time point of transmitting the sidelink channel by the terminal device and the time point of receiving the S-SSB by the terminal device are the same. The time point of receiving the sidelink channel by the terminal device and the time point of transmitting the S-SSB by the terminal device are the same.

In some implementations, the first parameter includes at least one of: a service priority, a service latency, a service reliability, a service throughput, or a QoS parameter.

In some implementations, the sidelink channel is a PSCCH, a PSSCH, or a PSFCH. The S-SSB includes an SLSS and a PSBCH.

Figure 7:
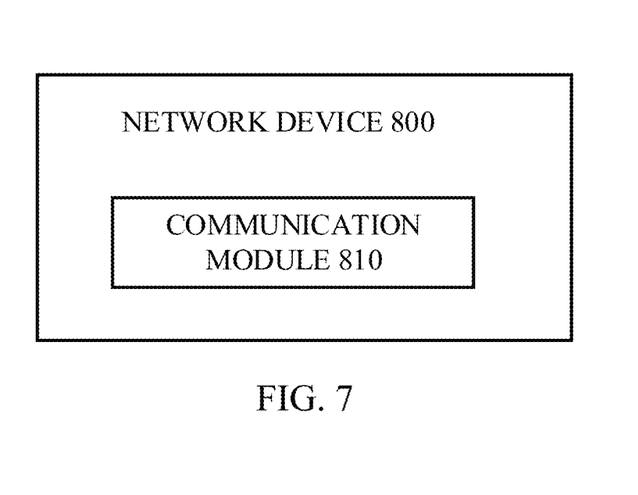
FIG. 7 is a schematic block diagram illustrating a network device according to an implementation of the present disclosure.

FIG. 7 is a schematic block diagram illustrating a network device 800 according to an implementation of the present disclosure. As illustrated in FIG. 7, the network device 800 includes a communication module 810 configured to transmit first configuration information to a terminal device, where the first configuration information is used by the terminal device to determine a basic parameter set used for transmitting a sidelink channel.

In some implementations, the first configuration information is indicative of a determination manner of the basic parameter set used for transmitting the sidelink channel.

In some implementations, the first configuration information is indicative of that the basic parameter set used for transmitting the sidelink channel and a basic parameter set used for transmitting the S-SSB are the same, on condition that the sidelink channel and the S-SSB are simultaneously transmitted, or indicative of that the basic parameter set used for transmitting the sidelink channel and the basic parameter set used for transmitting the S-SSB are the same or different, on condition that the sidelink channel and the S-SSB are not simultaneously transmitted.

In some implementations, the first configuration information is indicative of a basic parameter set of a resource pool of the sidelink channel, and the basic parameter set of the resource pool of the sidelink channel and the basic parameter set used for transmitting the S-SSB are the same.

In some implementations, the resource pool of the sidelink channel is a transmission resource pool of the sidelink channel or a reception resource pool of the sidelink channel.

In some implementations, the sidelink channel and the S-SSB being simultaneously transmitted includes at least one of the following. The sidelink channel and the S-SSB are simultaneously transmitted by the terminal device. The sidelink channel and the S-SSB are simultaneously received by the terminal device. Transmitting the sidelink channel by the terminal device and receiving the S-SSB by the terminal device simultaneously occur. Receiving the sidelink channel by the terminal device and transmitting the S-SSB by the terminal device simultaneously occur.

In some implementations, the sidelink channel is a PSCCH, a PSSCH, or a PSFCH. The S-SSB includes an SLSS and a PSBCH.

In some implementations, the communication module is configured to transmit the first configuration information to the terminal device via broadcast information, RRC signaling, or DCI.

Figure 8:
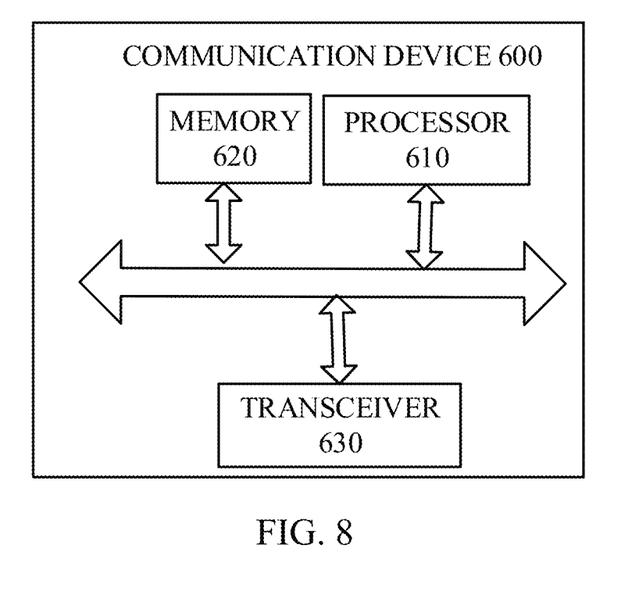
FIG. 8 is a schematic block diagram illustrating a communication device according to another implementation of the present disclosure.

FIG. 8 is a schematic structural view illustrating a communication device 600 according to an implementation of the present disclosure. The communication device 600 illustrated in FIG. 8 includes a processor 610. The processor 610 can invoke and run at least one computer program in a memory to implement the method in the implementation of the present disclosure.

In an implementation, as illustrated in FIG. 8, the communication device 600 may further include a memory 620. The processor 610 can invoke and run at least one computer program in the memory 620 to implement the method in the implementation of the present disclosure.

The memory 620 may be a single device independent of the processor 610, and may also be integrated in the processor 610.

In an implementation, as illustrated in FIG. 8, the communication device 600 may further include a transceiver 630. The processor 610 can control the transceiver 630 to communicate with other devices, for example, to transmit information or data to the other devices or receive information or data from other devices.

In an implementation, the transceiver 630 may include a transmitter and a receiver. The transceiver 630 may further include one or more antennas.

The communication device 600 may be the network device in the implementations of the present disclosure, and the communication device 600 can implement corresponding procedures realized by the network device in the methods in the implementations of the present disclosure, which will not be repeated herein for simplicity.

The communication device 600 may be the mobile terminal/terminal device in the implementations of the present disclosure, and the communication device 600 can implement corresponding procedures realized by the mobile terminal/terminal device in the methods in the implementations of the present disclosure, which will not be repeated herein for simplicity.

Figure 9:
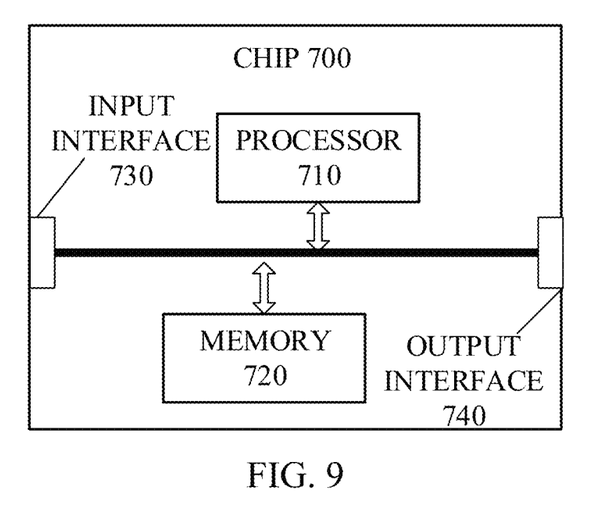
FIG. 9 is a schematic block diagram illustrating a chip according to an implementation of the present disclosure.

FIG. 9 is a schematic structural diagram illustrating a chip according to an implementation of the present disclosure. The chip 700 illustrated in FIG. 9 includes a processor 710. The processor 710 can invoke and run at least one computer program stored in a memory to implement the methods in the implementation of the present disclosure.

In an implementation, as illustrated in FIG. 7, the chip 700 may further include a memory 720. The processor 710 can invoke and run at least one computer program stored in the memory 720 to implement the methods in the implementations of the present disclosure.

The memory 720 may be a single device independent of the processor 710, and may also be integrated in the processor 710.

In an implementation, the chip 700 may further include an input interface 730. The processor 710 can control the input interface 730 to communicate with other devices or chips, for example, to receive information or data from other devices or chips.

In an implementation, the chip 700 may further include an output interface 740. The processor 710 can control the output interface 740 to communicate with other devices or chips, for example, to output information or data to the other devices or chips.

The chip can be applied to the network device in the implementations of the present disclosure, and the chip can implement corresponding procedures realized by the network device in the methods in the implementations of the present disclosure, which will not be repeated herein for simplicity.

The chip can be applied to the mobile terminal/terminal device in the implementations of the present disclosure, and the chip can implement corresponding procedures realized by the mobile terminal/terminal device in the methods in the implementations of the present disclosure, which will not be repeated herein for simplicity.

It is to be understood that the chip referred in the implementation of the present disclosure may also be referred to as a system-level chip, a system chip, a chip system, a system-on chip, or the like.

Figure 10:
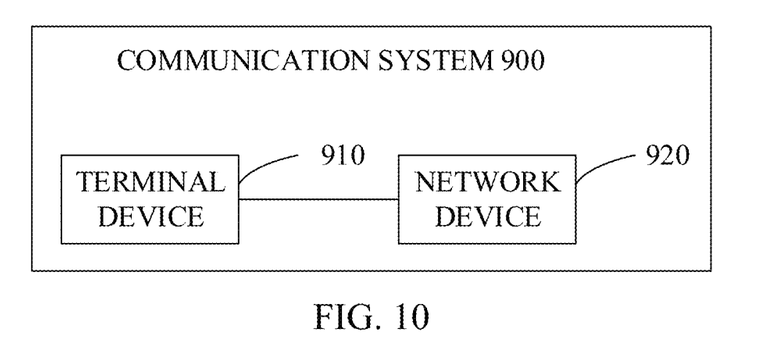
FIG. 10 is a schematic block diagram illustrating a communication system according to an implementation of the present disclosure.

FIG. 10 is a schematic block diagram illustrating a communication system 900 according to an implementation of the present disclosure. As illustrated in FIG. 10, the communication system 900 includes a terminal device 910 and a network device 920.

The terminal device 910 can be used to implement corresponding functions realized by the terminal device in the above method, and the network device 920 can be used to implement corresponding functions realized by the network device in the above method, which will not be repeated herein for simplicity.

It is to be understood that the processor in the implementation of the present disclosure may be an integrated circuit chip with signal processing capability. In the implementation process, the steps of the foregoing method implementations can be completed by hardware integrated logic circuits in the processor or instructions in the form of software. The above-mentioned processor may be a general-purpose processor, a digital signal processor (DSP), an application specific integrated circuit (ASIC), a field programmable gate array (FPGA) or other programming logic devices, discrete gates or transistor logic devices, or discrete hardware components. The methods, steps, and logical block diagrams disclosed in the implementations of the present disclosure can be implemented or executed. The general-purpose processor may be a microprocessor or the processor may also be any conventional processor or the like. The steps of the methods disclosed in the implementations of the present disclosure can be directly executed and completed by a hardware decoding processor, or executed and completed by a combination of hardware and software modules in the decoding processor. The software modules can be located in a mature storage medium in the field such as a random access memory, a flash memory, a read-only memory, a programmable read-only memory, an electrically erasable programmable memory, or a register. The storage medium is located in the memory, and the processor reads information in the memory and completes the steps of the above methods in combination with its hardware.

It can be understood that the memory may be a volatile memory or a non-volatile memory, and may also include both the volatile memory and non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and used for external high-speed cache. By way of examples rather than limitation, various random access memories can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It is to be noted that the memory described in this specification is intended to include but is not limited to these and any other suitable types of memories.

It is to be noted that the above memories are exemplary but not used for limitation. For example, the memory in the implementation of the present disclosure may also be a SRAM, a DRAM, an SDRAM, a DDR SDRAM, an ESDRAM, an SLDRAM, and a DR RAM. That is, the memory described in the implementation of the present disclosure is intended to include but is not limited to these and any other suitable types of memories.

Implementations of the present disclosure further provide a computer-readable storage medium configured to store at least one computer program.

In an implementation, the computer-readable storage medium can be applied to the network device in the implementations of the present disclosure, and the computer program enables a computer to execute corresponding procedures realized by the network device in the above methods in the implementations of the present disclosure, which will not be repeated herein for simplicity.

In an implementation, the computer-readable storage medium can be applied to the mobile terminal/terminal device in the implementations of the present disclosure, and the computer program enables the computer to execute corresponding procedures realized by the mobile terminal/terminal device in the above methods in the implementations of the present disclosure, which will not be repeated herein for simplicity.

Implementations of the present disclosure further provide a computer program product which includes at least one computer program instruction.

In an implementation, the computer program product can be applied to the network device in the implementations of the present disclosure, and the computer program instruction enables the computer to execute corresponding procedures realized by the network device in the above methods in the implementations of the present disclosure, which will not be repeated herein for simplicity.

In an implementation, the computer program product can be applied to the mobile terminal/terminal device in the implementations of the present disclosure, and the computer program instruction enables the computer to execute corresponding procedures realized by the mobile terminal/terminal device in the above methods in the implementations of the present disclosure, which will not be repeated herein for simplicity.

Implementations of the present disclosure further provide a computer program.

In an implementation, the computer program can be applied to the network device in the implementations of the present disclosure, and the computer program, when run in the computer, enables the computer to execute corresponding procedures realized by the network device in the above methods in the implementations of the present disclosure, which will not be repeated herein for simplicity.

In an implementation, the computer program can be applied to the mobile terminal/terminal device in the implementations of the present disclosure, and the computer program, when run in the computer, enables the computer to execute corresponding procedures realized by the mobile terminal/terminal device in the above methods in the implementations of the present disclosure, which will not be repeated herein for simplicity.

Those of ordinary skill in the art will appreciate that units and algorithmic operations of various examples described in connection with the implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

According to the several implementations provided in the present disclosure, it will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical coupling, mechanical coupling, or the like.

Separated units as illustrated may or may not be physically separated. Components or parts displayed as units may or may not be physical units, and may reside at one location or may be distributed to multiple networked units. Some of or all the units may be selectively adopted according to practical needs to achieve objectives of the solutions of the present disclosure.

In addition, the functional units in the various implementations of the present disclosure may be integrated into one processing unit, or each unit may exist alone physically, or two or more units may be integrated into one unit.

If the integrated units are implemented as software functional units and sold or used as standalone products, they may be stored in a computer readable storage medium. Based on such an understanding, the essential technical solution, or the portion that contributes to the relate art, or part of the technical solution of the present disclosure may be embodied as software products. The computer software products can be stored in a storage medium and may include multiple instructions that, when executed, can cause a computing device, e.g., a personal computer, a server, a network device, etc., to execute some of or all operations of the methods described in various implementations of the present disclosure. The above storage medium may include various kinds of media that can store program codes, such as a universal serial bus (USB) flash disk, a mobile hard drive, an ROM, an RAM, an RAM, a magnetic disk, or an optical disk.

The above are only specific implementations of the present disclosure, and the protection scope of the present disclosure is not limited to this. Any person skilled in the art can easily think of changes or substitutions within the technical scope disclosed in the present disclosure, and these changes or substitutions shall fall within the protection scope of the present disclosure. Therefore, the protection scope of the present disclosure shall be subject to the protection scope of the claims.

What is claimed is:

1. A method of wireless communication, comprising:
receiving, by a terminal device, first configuration information from a network device, wherein the first configuration information is used by the terminal device to determine a basic parameter set used for transmitting a sidelink channel, wherein:
the basic parameter set comprises at least one of a sub-carrier spacing or a cyclic prefix (CP) type; and
the sidelink channel comprises a physical sidelink feedback channel (PSFCH), and the basic parameter set used for transmitting the PSFCH and a basic parameter set used for transmitting a sidelink synchronization signal block (S-SSB) are the same.

2. The method of claim 1, wherein the first configuration information is indicative of a determination manner of the basic parameter set used for transmitting the sidelink channel.

3. The method of claim 2, wherein the first configuration information is indicative of that:
the basic parameter set used for transmitting the sidelink channel and the basic parameter set used for transmitting the S-SSB are the same.

4. The method of claim 1, wherein the first configuration information is used for configuring a basic parameter set of a resource pool of the sidelink channel.

5. The method of claim 4, wherein the resource pool of the sidelink channel is a transmission resource pool of the sidelink channel or a reception resource pool of the sidelink channel.

6. The method of claim 3, wherein:
the S-SSB comprises a sidelink synchronization signal (SLSS) and a physical sidelink broadcast channel (PSBCH).

7. The method of claim 1, wherein receiving, by the terminal device, the first configuration information from the network device comprises:
receiving, by the terminal device, the first configuration information from the network device via broadcast information, radio resource control (RRC) signaling, or downlink control information (DCI).

8. A terminal device, comprising:
a transceiver;
at least one processor; and
a memory storing computer programs which, when executed by the at least one processor, cause the transceiver to:
receive first configuration information from a network device, wherein the first configuration information is used by the terminal device to determine a basic parameter set used for transmitting a sidelink channel, wherein:
the basic parameter set comprises at least one of a sub-carrier spacing or a cyclic prefix (CP) type; and
the sidelink channel comprises a physical sidelink feedback channel (PSFCH), and the basic parameter set used for transmitting the PSFCH and a basic parameter set used for transmitting a sidelink synchronization signal block (S-SSB) are the same.

9. The terminal device of claim 8, wherein the first configuration information is indicative of a basic parameter set of a resource pool of the sidelink channel.

10. The terminal device of claim 9, wherein the resource pool of the sidelink channel is a transmission resource pool of the sidelink channel or a reception resource pool of the sidelink channel.

11. The terminal device of claim 9, wherein:
the S-SSB comprises a sidelink synchronization signal (SLSS) and a physical sidelink broadcast channel (PSBCH).

12. The terminal device of claim 8, wherein the computer programs, when executed by the at least one processor, causes the transceiver to:
receive the first configuration information from the network device via broadcast information, radio resource control (RRC) signaling, or downlink control information (DCI).

13. A non-transitory computer readable storage medium comprising computer programs which, when executed by a terminal device, cause the terminal device to:
receive first configuration information from a network device, wherein the first configuration information is used by the terminal device to determine a basic parameter set used for transmitting a sidelink channel, wherein:
the basic parameter set comprises at least one of a sub-carrier spacing or a cyclic prefix (CP) type; and
the sidelink channel comprises a physical sidelink feedback channel (PSFCH), and the basic parameter set used for transmitting the PSFCH and a basic parameter set used for transmitting a sidelink synchronization signal block (S-SSB) are the same.

14. The non-transitory computer readable storage medium of claim 13, wherein the first configuration information is used for configuring a basic parameter set of a resource pool of the sidelink channel.

15. The non-transitory computer readable storage medium of claim 14, wherein the resource pool of the sidelink channel is a transmission resource pool of the sidelink channel or a reception resource pool of the sidelink channel.

16. The non-transitory computer readable storage medium of claim 14, wherein:
the S-SSB comprises a sidelink synchronization signal (SLSS) and a physical sidelink broadcast channel (PSBCH).

17. The non-transitory computer readable storage medium of claim 13, wherein the computer programs, when executed by the terminal device, causes the terminal device to:
receive the first configuration information from the network device via broadcast information, radio resource control (RRC) signaling, or downlink control information (DCI).

* * * * *